(12) United States Patent
Fuwa et al.

(10) Patent No.: US 7,685,978 B2
(45) Date of Patent: Mar. 30, 2010

(54) CONTROL DEVICE AND METHOD FOR VARIABLE VALVE MECHANISM

(75) Inventors: Naohide Fuwa, Nishikamo-gun (JP); Takashi Yanagizawa, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 9 days.

(21) Appl. No.: 11/646,272

(22) Filed: Dec. 28, 2006

(65) Prior Publication Data

US 2007/0163525 A1   Jul. 19, 2007

(30) Foreign Application Priority Data

Jan. 17, 2006   (JP)   ............................. 2006-009008

(51) Int. Cl.
*F01L 1/34*   (2006.01)
(52) U.S. Cl. ................................ 123/90.16; 123/90.15
(58) Field of Classification Search ............... 123/90.15, 123/90.16
See application file for complete search history.

(56) References Cited

U.S. PATENT DOCUMENTS

| 2001/0023674 A1* | 9/2001 | Shimizu et al. | .......... 123/90.18 |
| 2002/0195071 A1* | 12/2002 | Shimizu et al. | .......... 123/90.16 |
| 2004/0040524 A1* | 3/2004 | Kanamaru et al. | ....... 123/90.12 |

FOREIGN PATENT DOCUMENTS

| JP | A 2001-263015 | 9/2001 |
| JP | A 2004-183591 | 7/2004 |
| JP | A-2004-324458 | 11/2004 |
| JP | A-2005-220760 | 8/2005 |

* cited by examiner

*Primary Examiner*—Zelalem Eshete
(74) *Attorney, Agent, or Firm*—Oliff & Berridge, PLC

(57) ABSTRACT

A control device for a variable valve mechanism that avoids the overheating an actuator while reducing adverse effects on the driveability of a vehicle. The actuator adjusts the lift of an intake valve by moving a drive element, and a sensor is used to determine whether the actuator will overheat. A control unit stops the drive element if the lift adjusted by the actuator is equal to or larger than a first predetermined value, when the control unit determines that the actuator will overheat. The actuator may be an electric actuator. In this case, the actuator maintains the drive element in a fixed position when supply of electric power to the actuator is interrupted. The control unit stops the drive element, and interrupts the supply of electric power to the actuator.

18 Claims, 9 Drawing Sheets

CONTROL DEVICE AND METHOD FOR VARIABLE VALVE MECHANISM

INCORPORATION BY REFERENCE

The disclosure of Japanese Patent Application No. 2006-009008 filed on Jan. 17, 2006 including the specification, drawings and abstract is incorporated herein by reference in its entirety.

BACKGROUND OF THE INVENTION

1. Field of the Invention

The invention relates to a control device and method for a variable valve mechanism. More specifically, the invention relates to a control device for a variable valve mechanism that changes the operating characteristic of at least one of an intake valve and an exhaust valve in an internal combustion engine.

2. Description of the Related Art

Japanese Patent Application Publication No. JP-A-2004-183591 describes a control device for an internal combustion engine with a variable valve mechanism. When the actuator that drives the variable valve mechanism of the internal combustion engine overheats, the control device fixes the valve lift at the maximum value, and controls the amount of intake air using only a throttle valve, to stop the and suppress the overheating of the actuator. After the temperature of the actuator has decreased, the normal control resumes.

However, if the valve lift is fixed at the maximum value immediately after it is determined that the actuator overheats, the amount of intake air suddenly increases. As a result, a driver may feel vibrations (torque shock) due to the change in engine torque. Also, if the valve lift is suddenly set to an optimum value instead of the maximum value when the normal control is resumed, the driver may feel a torque shock.

The above-described patent publication does not describe any control for preventing the torque shock.

SUMMARY OF THE INVENTION

The invention provides a control device and method for a variable valve mechanism, which avoids the overheating of an actuator, while reducing adverse effects on the drivability of a vehicle.

The invention provides a control device for a variable valve mechanism. The control device includes a drive element, provided in the variable valve mechanism that determines a lift of at least one of an intake valve and an exhaust valve in an internal combustion engine; an actuator that adjusts the lift of the at least one of the intake valve and the exhaust valve by moving the drive element in a variable valve control; a sensor used to determine whether the actuator will overheat; and a control unit that ends the variable valve control and stops the drive element if the lift adjusted by the actuator is equal to or larger than a first predetermined value, when the control unit determines that the actuator will overheat.

The actuator may be an electric actuator. The actuator may maintain the drive element in a fixed position when supply of electric power to the actuator is interrupted. The control unit may further interrupt the supply of electric power to the actuator.

The control device may further include a sensor, provided in the variable valve mechanism, that detects changes in the position of the drive element. The sensor may output signals indicating the position of the drive element. The control unit may restart the supply of electric power to the actuator when the position of the drive element deviates from the fixed position by at least a second predetermined value after the supply of electric power to the actuator is interrupted.

The control unit may restart the supply of electric power to the actuator when the variable valve mechanism satisfies a condition for restarting operation of the actuator. The operation of the actuator may restart when the temperature of the actuator has decreased to a temperature that is equal to or below a threshold temperature at which the operation of the actuator is stopped.

The control unit may execute a control to fix the position of the drive element, immediately after the supply of electric power to the actuator restarts.

The control unit may execute the control to fix the position of the drive element during the supply of electric power to the actuator restarts. The control unit may execute the variable valve control to change the position of the drive element using the actuator when a request relating to an operation of an internal combustion engine satisfies a condition for resuming the variable valve control.

The condition for resuming the variable valve control may be satisfied, when, for example, a driver requests acceleration. In addition, the condition for starting the variable valve control may be satisfied when a difference between a position of the drive element, which is estimated on an assumption that the variable valve control is executed, and the fixed position of the drive element is equal to or smaller than a predetermined amount.

The variable valve mechanism may increase the lift, and the duration that represents the period in which the at least one of the intake valve and the exhaust valve is held open in terms of crank angle, by moving the drive element.

Thus, the invention provides the control device for the variable valve mechanism that avoids the overheating of an actuator while reducing adverse effects on the drivability of a vehicle.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE INVENTION

Figure 1:
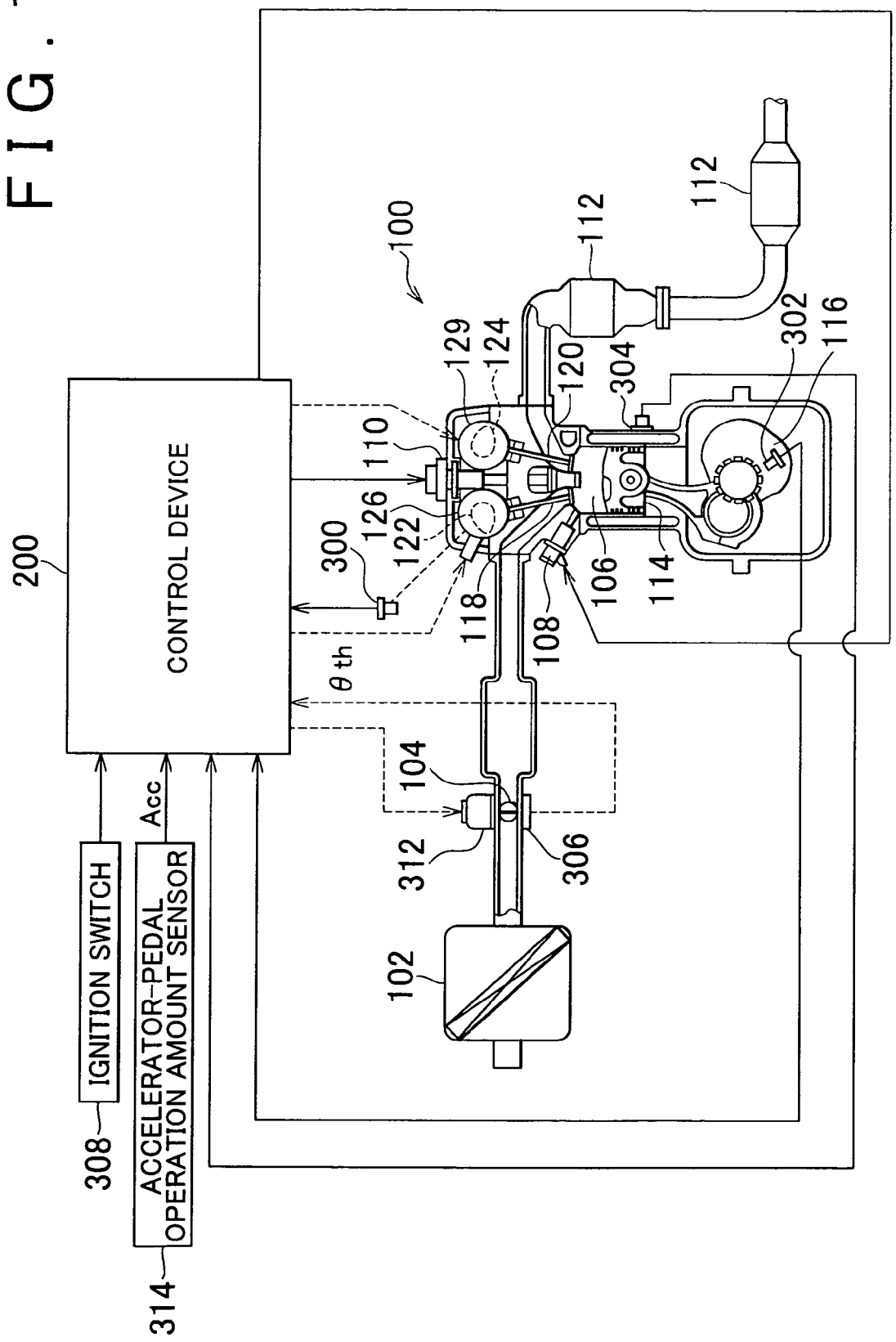
FIG. 1 is a diagram showing the configuration of an engine according to an embodiment of the invention.

Hereinafter, an embodiment of the invention will be described in detail with reference to the drawings. In the drawings, the same or corresponding portions are denoted by the same reference numerals, and redundant description thereof will be omitted.

FIG. 1 shows the configuration of an engine 100 according to an embodiment of the invention. As shown in FIG. 1, a control device for a variable valve mechanism according to the embodiment is realized when a control unit 200 in FIG. 1 executes programs.

Air is taken into the engine 100 through an air cleaner 102. A throttle valve 104 adjusts the amount of air taken into the engine 100. The throttle valve 104 is an electrically controlled throttle valve driven by a throttle motor 312.

Air is mixed with fuel in a cylinder 106 (combustion chamber). An injector 108 injects fuel directly into the cylinder 106. That is, the injection hole of the injector 108 is positioned in the cylinder 106. Fuel is injected from the intake-side of the cylinder 106 (i.e., the side from which air is introduced).

Fuel is injected during an intake stroke. However, the timing at which fuel is injected is not limited to the timing during the intake stroke. In this embodiment, the engine 100 is a direct-injection engine in which the injection hole of the injector 108 is positioned in the cylinder 106. However, in addition to the injector 108 that injects fuel directly into the cylinder 106, another injector that injects fuel into an intake port may be provided. Alternatively, only the injector that injects fuel into the intake port may be provided.

The air-fuel mixture in the cylinder 106 is ignited by an ignition plug 110, and burned. After the air-fuel mixture is burned, exhaust gas is purified by a three-way catalyst 112. Then, the exhaust gas is discharged to the outside of a vehicle. By burning the air-fuel mixture, a piston 114 is pushed downward, and a crankshaft 116 rotates.

A pair of intake valves 118 and a pair of exhaust valves 120 are provided in the top portion of the cylinder 106. Each intake valve 118 controls the amount of air introduced into the cylinder 106 and the timing at which air is introduced into the cylinder 106. Each exhaust valve 120 controls the amount of exhaust gas discharged from the cylinder 106 and the timing at which the exhaust gas is discharged from the cylinder 106. A cam 122 drives the intake valve 118. A cam 124 drives the exhaust valve 120.

A variable valve timing and lift mechanism (hereinafter, referred to as "VVTL mechanism) 126 controls the opening/closing timings, the lift, and the duration of the intake valve 118. A variable valve timing mechanism (hereinafter, referred to as "VVT mechanism) 129 controls the opening/closing timings of the exhaust valve 120. The lift and the duration of the exhaust valve 120 may also be controlled.

The VVTL mechanism 126 is formed by combining the VVT mechanism, with the VVL mechanism that controls the lift and the duration. The VVL mechanism may control either the lift or the duration.

In this embodiment, the VVT mechanism controls the opening/closing timings of the intake valve 118 by rotating the cam 122. The method of controlling the opening/closing timings is not limited to this method. As the VVT mechanism, a known ordinary VVT mechanism is used. Therefore, detailed description of the VVT mechanism will be omitted. The VVL mechanism will be described later.

The control unit 200 controls a throttle-valve opening amount θth, an ignition timing, a fuel-injection timing, the amount of fuel to be injected, and the operating state of the intake valve 118 (for example, the opening/closing timings, lift, and duration) to operate the engine 100 in a desired state. The control unit 200 receives signals from a cam-angle sensor 300, a crank-angle sensor 302, a knock sensor 304, a throttle-valve opening amount sensor 306, an ignition switch 308, and an accelerator-pedal operation amount sensor 314.

The cam-angle sensor 300 outputs a signal that indicates the position of the cam. The crank-angle sensor 302 outputs signals that indicate the rotational speed of the crankshaft 116 (i.e., engine speed), and the rotational angle of the crankshaft 116. The knock sensor 304 outputs a signal that indicates the intensity of vibrations of the engine 100. The throttle-valve opening amount sensor 306 outputs a signal that indicates the throttle-valve opening amount θth. When the driver turns the ignition switch 308 on, the ignition switch 308 outputs the signal to indicate that the ignition switch 308 is on. The accelerator-pedal operation amount sensor 314 outputs a signal that indicates the accelerator-pedal operation amount Acc corresponding to the amount by which the accelerator pedal is depressed.

The control unit 200 controls the engine 100 based on the signals from the sensors, and maps and programs stored in memory (not shown).

Figure 2:
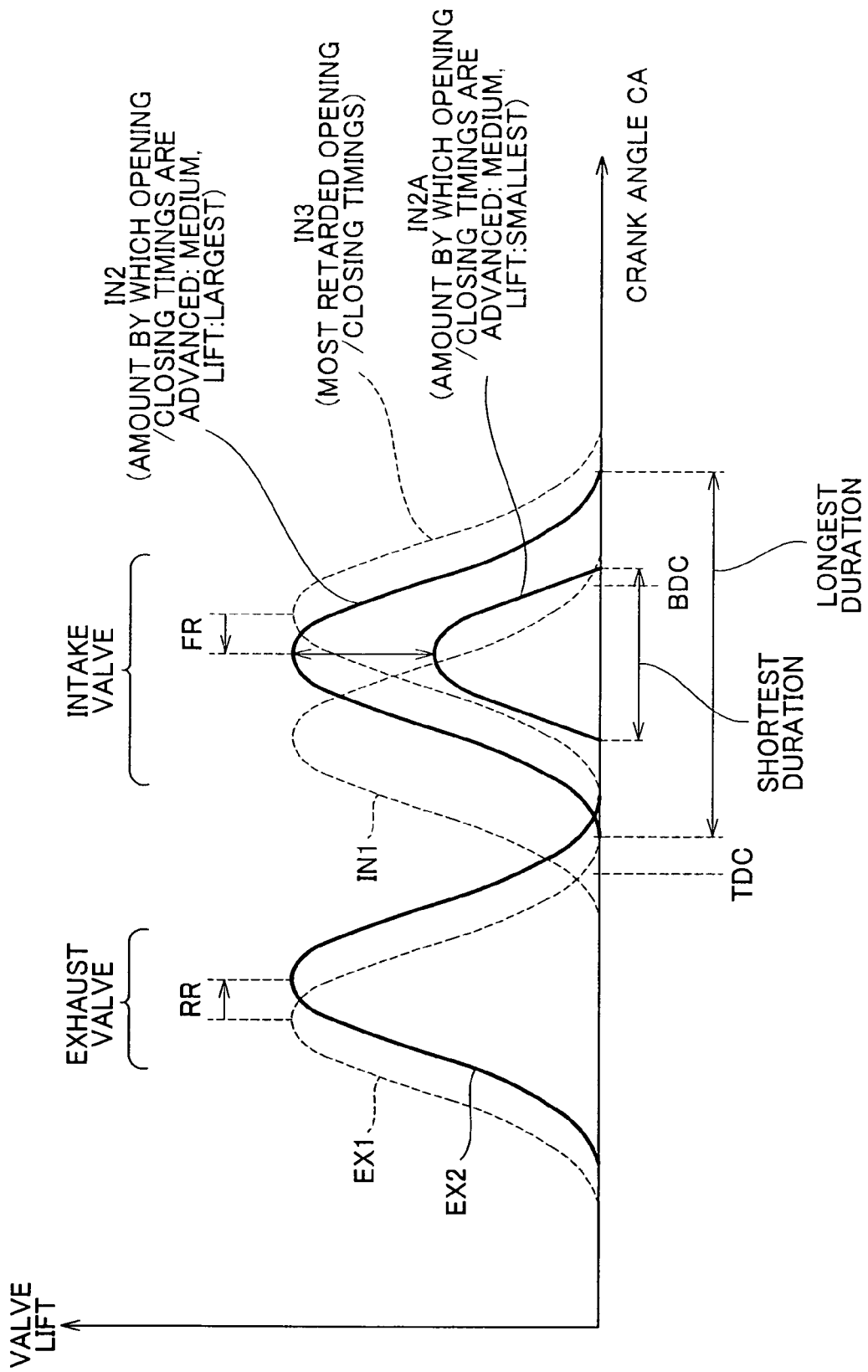
FIG. 2 is a diagram showing the relation between a valve lift and a crank angle in a variable valve mechanism.

FIG. 2 shows the relation between the valve lift and the crank angle in the variable valve mechanism.

As shown in FIG. 2, the exhaust valve opens and closes during the exhaust stroke, and the intake valve opens and closes during the intake stroke. Waveforms EX1, EX2 indicate the lift of the exhaust valve. Waveforms IN1 to IN3, and IN2a indicate the lift of the intake valve. The VVT mechanism 129 for the exhaust valve changes the opening/closing timings of the exhaust valve in the range from the opening/closing timings indicated by the waveform EX1 to the opening/closing timings indicated by the waveform EX2. The arrow RR indicates the amount by which the opening/closing timings of the exhaust valve are retarded with respect to the most advanced opening/closing timings indicated by the waveform EX1.

The VVT mechanism for the intake valve changes the opening/closing timings of the intake valve in the range from the opening/closing timings indicated by the waveform IN1 to the opening/closing timings indicated by the waveform IN3. The arrow FR indicates the amount by which the opening/closing timings of the intake valve are advanced with respect to the most retarded opening/closing timings indicated by the waveform IN3.

The top dead center is referred to as "TDC". The bottom dead center is referred to as "BDC". Both of the exhaust valve and the intake valve are open when the piston is near TDC. The period in which both of the exhaust valve and the intake valve are open is referred to as "overlap period". The VVT mechanisms for the intake valve and the exhaust valve adjust the overlap period. If the overlap period increases when the engine speed is high, a large amount of air is taken into the cylinder to improve the output of the engine. If the overlap period increases when the engine speed is low, exhaust gas returns into the cylinder, and combustion is made unstable.

Further, the lift and duration of the intake valve can be changed in a given range.

That is, the lift in the waveform IN2 is at its maximum, and the lift in the waveform IN2A is at its minimum. The duration represents the period in which the intake valve is held open in terms of crank angle. The duration in the waveform 1N2 is longest, and the duration in the waveform IN2a is shortest.

Figure 3:
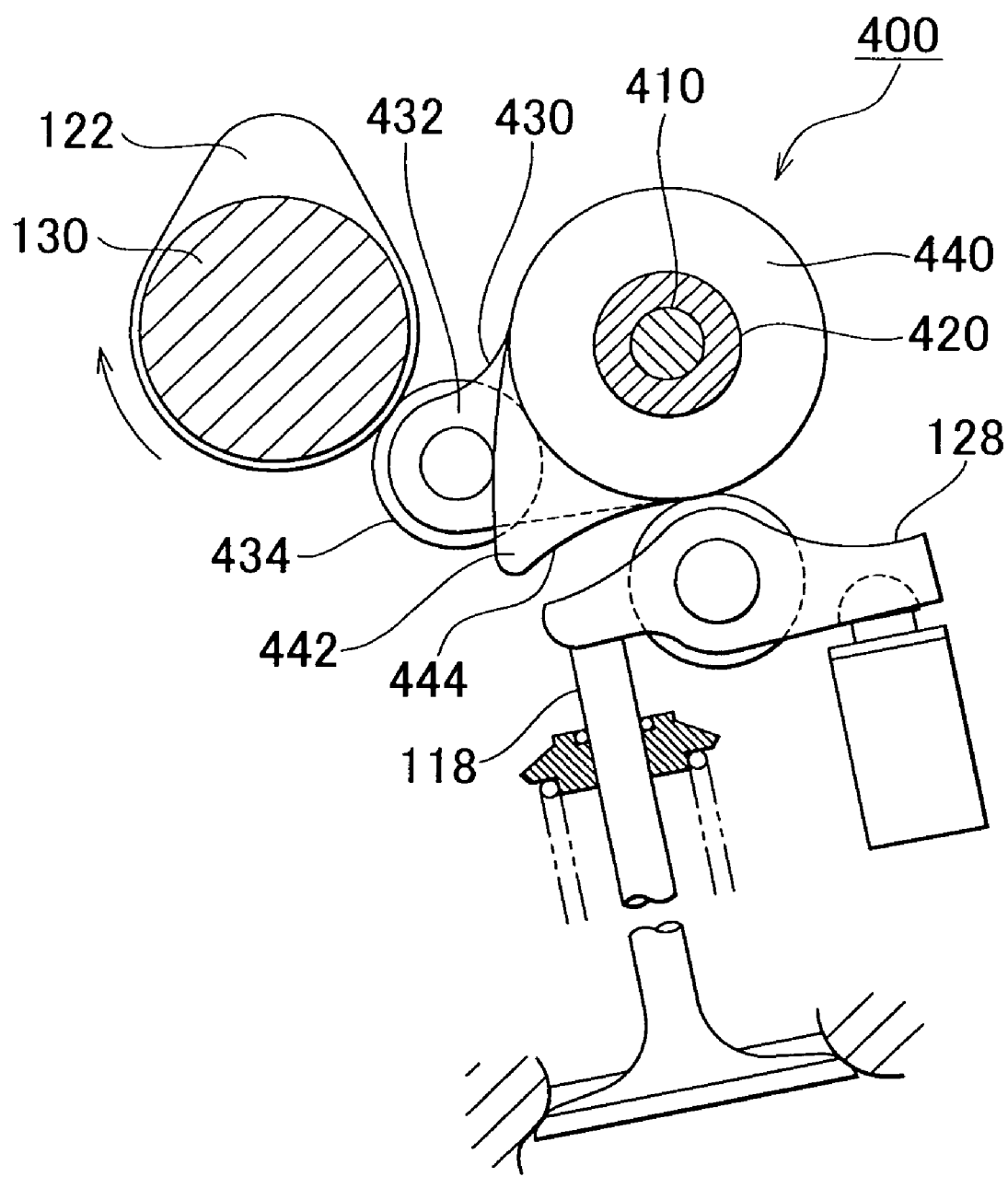
FIG. 3 is a front view showing a VVL mechanism that controls the lift and duration of an intake valve.

FIG. 3 is a front view of the VVL mechanism 400 that controls the lift and duration of the intake valve.

As shown in FIG. 3, the VVL mechanism 400 includes a drive shaft 410, a support pipe 420, an input arm 430, and an oscillating cam 440. The drive shaft 410 extends in one direction. The support pipe 420 covers the outer surface of the drive shaft 410. The input arm 430 and the oscillating cam 440 are provided around the outer surface of the support pipe 420, and are arranged in the axial direction of the drive shaft 410. The actuator, which linearly moves the drive shaft 410, is provided at the end of the drive shaft 410.

In the VVL mechanism 400, one cam 122 is provided for each cylinder. One input arm 430 corresponds to the one cam 122. One oscillating cam 440 is provided on one side of the input arm 430, and another oscillating cam 440 is provided on the other side of the input arm 430. The two oscillating cams 440 correspond to the pair of intake valves 118 provided for each cylinder.

The support pipe 420 has a hollow cylindrical shape. The support pipe 420 is disposed in parallel with the camshaft 130. The support pipe 420 is fixed to a cylinder head to prevent the axial movement or rotation of the support pipe 420.

The drive shaft 410 is inserted into the support pipe 420 such that the drive shaft 410 slidably moves in the axial direction. The input arm 430 and the two oscillating cams 440 are provided around the outer surface of the support pipe 420. The input arm 430 and the two oscillating cams oscillate around the axis of the drive shaft 410, but do not move in the axial direction.

The input arm 430 includes an arm portion 432 and a roller portion 434. The arm portion 432 protrudes away from the outer surface of the support pipe 420. The roller portion 434 is connected to the end of the arm portion 432 such that the roller portion 434 rotates. The input arm 430 is positioned such that the roller portion 434 contacts the cam 122.

The oscillating cam 440 includes a lobe 442 that has a substantially triangular shape. The lobe 442 protrudes away from the outer surface of the support pipe 420. The lobe 442 has a cam surface 444 that has a concave shape. A roller is fitted to a rocker arm 128 such that the roller rotates. The roller is pressed to the cam surface 444 by the force of a valve spring provided in the intake valve 118.

The input arm 430 and the oscillating cam 440 integrally oscillate around the axis of the drive shaft 410. Therefore, when the camshaft 130 rotates, the input arm 430, which is in contact with the cam 122, oscillates, and the oscillating cam 440 also oscillates due to the movement of the input arm 430. The movement of the oscillating cams 440 is transmitted to the intake valve 118 via the rocker arm 128. Thus, the intake valve opens and closes.

The VVL mechanism 400 further includes a mechanism that changes the difference between the phases of the input arm 430 and the oscillating cam 440 around the axis of the support pipe 420. This mechanism appropriately changes the lift and duration of the intake valve 118.

That is, when the phase difference increases, the oscillation angle of the rocker arm 128 with respect to the oscillation angle of the input arm 430 and the oscillating cam 440 increases. This increases the lift and duration of the intake valve 118.

When the phase difference decreases, the oscillation angle of the rocker arm 128 with respect to the oscillation angle of the input arm 430 and the oscillating cam 440 decreases. This decreases the lift and duration of the intake valve 118.

Figure 4:
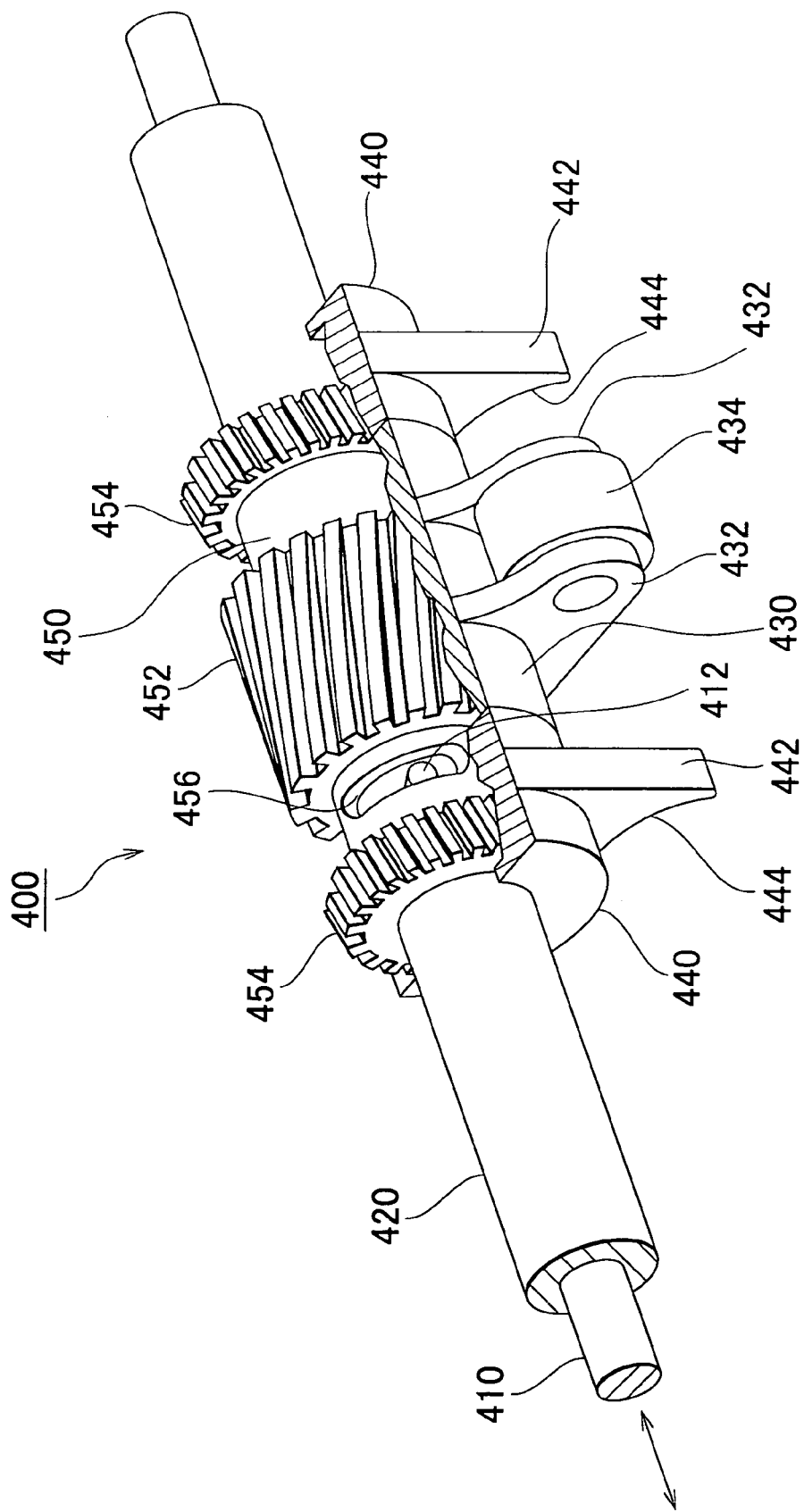
FIG. 4 is a cutaway view partially showing the VVL mechanism.

FIG. 4 is a perspective view that shows part of the VVL mechanism. In FIG. 4, a cutaway view of the VVL shows the internal structure of the VVL mechanism.

As shown in FIG. 4, a slider gear 450 is housed in the space defined by the input arm 430, the two oscillating cams 440, and the outer surface of the support pipe 420. The slider gear 450 is supported on the support pipe 420. The slider gear 450 rotates around the support pipe 420, and slides on the support pipe 420 in the axial direction.

A helical gear 452 is provided at the center of the slider gear 450 in the axial direction. The right-hand helical spline is formed in the helical gear 452. Helical gears 454 are provided on the sides of the helical gear 452. The left-hand helical spline is formed in each helical gear 454.

Helical splines are formed on the inner surfaces of the input arm 430 and the two oscillating cams 440. The helical splines engage with the helical gears 452 and 454. That is, the right-hand helical spline is formed on the inner surface of the input arm 430. The right-hand helical spline engages with the helical gear 452. The left-hand helical spline is formed on the inner surface of each oscillating cam 440. The left-hand helical spline engages with the helical gear 454.

A long hole 456 is formed in the slider gear 450 at the position between one helical gear 454 and the helical gear 452. The long hole 456 extends in the circumferential direction. A long hole (not shown) is formed in the support pipe 420. The long hole (not shown) extends in the axial direction, and partially overlaps the long hole 456. An engagement pin 412 is integrally formed on the drive shaft 410. The drive shaft 410 is inserted into the support pipe 420. The engagement pin 412 protrudes through the area where the long hole 456 and the long hole (not shown) partially overlap with each other.

When the drive shaft 410 moves in the axial direction, the engagement pin 412 pushes the slider gear 450. As a result, the helical gears 452 and 454 simultaneously move in the axial direction of the drive shaft 410. However, the input arm 430 and the oscillating cams 440, which engage with the helical gears 452 and 454 through splines, do not move in the axial direction. Therefore, the input arm 430 and the oscillating cams 440 pivot around the drive shaft 410 due to the engagement of the helical splines.

The torsional direction of the helical spline formed on the inner surface of the input arm 430 is opposite to the torsional direction of the helical spline formed on the inner surface of the oscillating cam 440. Therefore, the input arm 430 and the oscillating cam 440 pivot in the opposite directions. Thus, the difference between the phases of the input arm 430 and the oscillating cam 440 can be changed. This permits the lift and duration of the intake valve 118 to be changed in the manner described above. However, the configuration of the VVL mechanism is not limited to this configuration.

Figure 5:
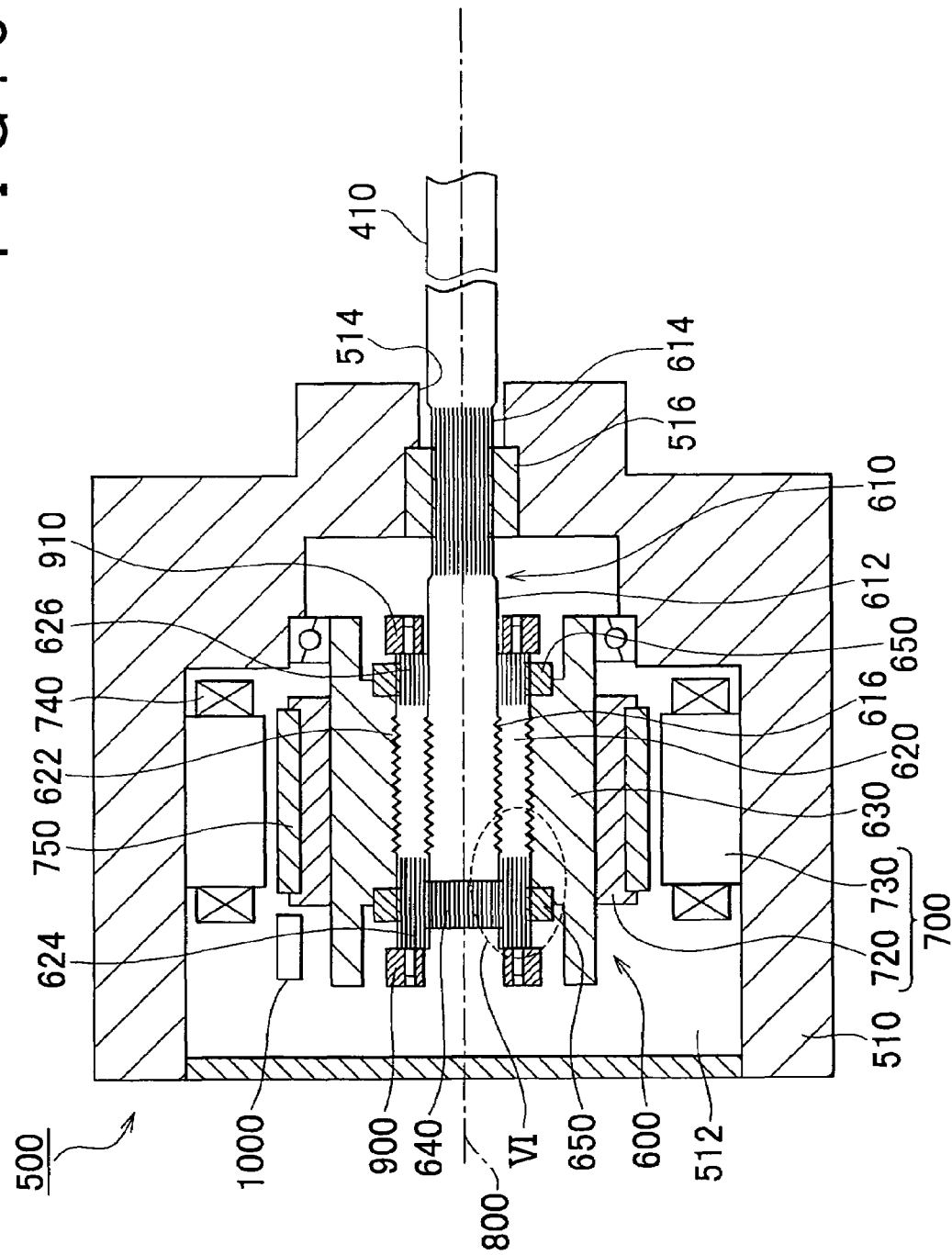
FIG. 5 is a sectional view showing an actuator that linearly moves the drive shaft of the VVL mechanism in an axial direction.

FIG. 5 is a sectional view showing an actuator 500 that linearly moves the drive shaft 410 of the VVL mechanism 400.

As shown in FIG. 5, the actuator 500 includes a housing 510, a differential roller gear 600, and a motor 700. The housing 510 defines a space 512. The differential roller gear 600 converts rotational movement to linear movement. The motor 700 inputs the rotational movement to the differential roller gear 600. An opening 514 is formed in the housing 510. The opening 514 is open toward the cylinder head on which the VVL mechanism 400 is provided.

The differential roller gear 600 includes a sun shaft 610, a plurality of planetary shafts 620, and a nut 630. The sun shaft 610 extends along an axis 800. The planetary shafts 620 extend on the outer surface of the sun shaft 610 in parallel with the axis 800. The planetary shafts 620 are arranged around the axis 800 in the circumferential direction. The nut 630, which has a cylindrical shape, is formed around the axis 800 to surround the planetary shafts 620.

The sun shaft 610, which extends along the axis 800, is aligned with the drive shaft 410. The sun shaft 610 protrudes from the space 512 to the outside of the housing 510 through the opening 514. The sun shaft 610 is connected to the drive shaft 410 using a coupling or the like (not shown).

The sun shaft 610 includes a spline portion 614 and a thread portion 616. A spline is formed in the spline portion 614. A male thread is formed in the thread portion 616. A ring-shaped sun gear 640 is fitted to the end of the sun shaft 610, which is positioned in the space 512. A spur gear is formed on the outer surface of the sun gear 640. In the spur gear, teeth are arranged around the axis 800 in the circumferential direction.

A stopper collar 516 is fixed to the sun shaft 610 to surround the spline portion 614. A spline is formed on the inner surface of the stopper collar 516. By engaging the stopper collar 516 with the spline portion 614, the rotational movement of the sun shaft 610 around the axis 800 is restricted.

Retainers 900 and 910 are provided at the ends of the planetary shaft 620. Each of the retainers 900 and 910 having a ring shape is provided around the axis 800. The ends of the planetary shafts 620 are supported by the retainers 900 and 910 such that the planetary shafts 620 rotate. The retainers 900 and 910 are positioned at a predetermined interval in the direction of the axis 800. The retainers 900 and 910 are connected with each other by a support column that extends in parallel with the planetary shafts 620.

The motor 700 includes a rotor 720 and a stator 730. The rotor 720 is fixed to the outer surface of the nut 630, for example, by shrinkage fitting, press fitting, or adhesive agent. A stator 730 is fixed to the housing 510, for example, by shrinkage fitting, press fitting, or adhesive agent. A coil 740 is wound around the stator 730.

The stator 730, having a ring shape, is provided around the axis 800 to surround the rotor 720. The rotor 720 is positioned around the axis 800 along the circumferential direction such that a predetermined space formed between the rotor 720 and the stator 730. Permanent magnets 750 are disposed on the rotor 720 at intervals of a predetermined angle around the axis 800 such that the permanent magnets 750 face the stator 730. By supplying electric power to the coil 740, a magnetic field is generated between the rotor 720 and the stator 730. Thus, the rotor 720 and the nut 630 rotate around the axis 800.

Each planetary shaft 620 includes a thread portion 622, and gear portions 624 and 626 that are formed on the sides of the thread portion 622.

Figure 6:
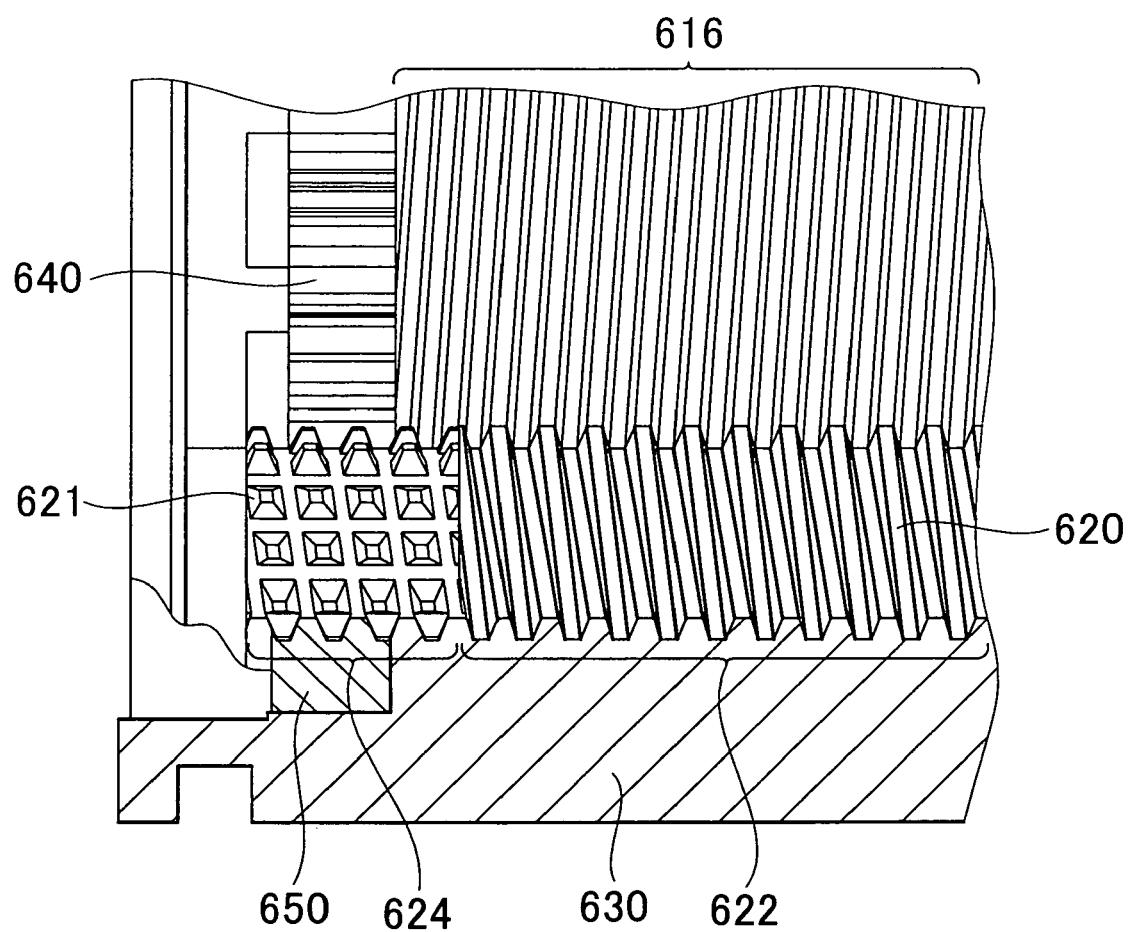
FIG. 6 is an enlarged view showing the detail of the VI portion of the actuator in FIG. 5.

FIG. 6 is an enlarged view showing the detail of the VI portion of the actuator 500 in FIG. 5.

As shown in FIG. 5 and FIG. 6, a male thread is formed in the thread portion 622 of each planetary shaft 620. The male thread formed in the thread portion 622 engages with the male thread formed in the thread portion 616 of the sun shaft 610, and the female thread formed on the inner surface of the nut 630. The torsional direction of the male thread formed in the thread portion 622 of each planetary shaft 620 is opposite to the torsional direction of the male thread formed in the thread portion 616 of the sun shaft 610, and is the same as the torsional direction of the female thread formed on the inner surface of the nut 630.

A spur gear is formed in the gear portion 624 of each planetary shaft 620. The spur gear formed in the gear portion 624 engages with the spur gear formed on the outer surface of the sun gear 640, and the spur gear formed on the inner surface of a ring gear 650. The spur gear is formed, for example, by a roll threading process, or a cutting process, at the end of the planetary shaft 620 in which a male thread is formed on the entire outer surface. A spur gear is also formed in the gear portion 626 of each planetary shaft 620. The spur gear formed in the gear portion 626 engages with the spur gear formed on the inner surface of the ring gear 650.

The nut 630 is supported by a bearing fixed to the housing 510 such that the nut 630 rotates around the axis 800. A female thread is formed on the inner surface of the nut 630. The torsional direction of the female thread formed on the inner surface of the nut 630 is opposite to the torsional direction of the male thread formed in the thread portion 616 of the sun shaft 610.

The ring gears 650 are fixed to the nut 630 such that the ring gears 650 are positioned on the sides of the inner surface on which the female thread is formed. A spur gear is formed on the inner surface of each ring gear 650. In the spur gear, teeth are arranged around the axis 800 in the circumferential direction.

The male thread formed in the thread portion 616 of the sun shaft 610, the male thread formed in the thread portion 622 of each planetary shaft 620, and the female thread formed on the inner surface of the nut 630 are the multiple threads that have the same pitch. Because the sun shaft 610 moves in the direction of the axis 800 during a stroke in this embodiment, the number of helices in each thread is determined, for example, based on the relation represented by the equation, $Ns:Np:Nn = (Ds+1):Dp:Dn$. In this equation, Ds, Dp, and Dn represent the pitch circle diameters of the male thread formed on the sun shaft 610, the male thread formed on each planetary shaft 620, and the female thread formed on the nut 630, respectively. Ns, Np, and Nn represent the numbers of helices in the male thread formed on the sun shaft 610, the male thread formed on each planetary shaft 620, and the female thread formed on the nut 630, respectively. However, the relation between the pitch circle diameters and the numbers of starts may be represented by other equations.

When the nut 630 rotates, the rotation of the nut 630 is transmitted to each planetary shaft 620, because the female thread formed on the inner surface of the nut 630 engages with the male thread formed in each planetary shaft 620. The spur gear formed in the gear portion 624 of each planetary shaft 620 then engages with the spur gears formed on the outer surface of the sun gear 640 and on the inner surface of the ring gear 650. Also, the spur gear formed in the gear portion 626 of the planetary shaft 620 engages with the spur gear formed on the inner surface of the ring gear 650.

Therefore, each planetary shaft 620 does not move in the direction of the axis 800. However, each planetary shaft 620 moves around the axis 800, while rotating around its axis. At the same time, each planetary shaft 620 is kept in parallel with the axis 800 due to the engagement of the above-described spur gears.

Because the thread formed on each planetary shaft 620 engages with the thread formed on the sun shaft 610, the rotational movement of each planetary shaft 620 is transmitted to the sun shaft 610. The rotational movement of the sun shaft 610 is restricted by the stopper collar 516. Therefore, the sun shaft 610 moves along the direction of the axis 800. As a result, the drive shaft 410 moves linearly. This changes the lift and duration of the intake valve 118, as described above.

A sensor 1000 detects the operation amount (i.e., rotational speed or rotational angle) of the motor 700 (rotor 720). The signal that indicates the result of detection is transmitted to the control unit 200. In this embodiment, the control unit 200 indirectly detects the lift and duration of the intake valve 118 based on the operation amount of the motor 700, using a map that indicates the relation between the operation amount of the motor 700, and the lift and duration of the intake valve 118.

According to the duty ratio of the control signal transmitted from the control unit 200, the motor 700, which is the actuator, maintains the drive shaft 410, which is the drive element, in a neutral state, or moves the drive shaft 410 toward the "maximum-side position" to increase the lift and duration, or toward the "minimum-side position" to decrease the lift and duration. When the drive shaft 410 is at the "maximum-side position", the lift is at its maximum, and the duration is longest. When the drive shaft 410 is at the "minimum-side position", the lift is at its minimum, and the duration is shortest.

When the force is applied by the drive shaft 410 along the direction of the axis 800, the motor 700 does not rotate for the following reason. The thread portion 616 of the sun shaft 610 engages with the thread portion of each planetary shaft 620, and the thread portion of each planetary shaft on the side opposite to the sun shaft 620 engages with the female thread formed in the thread portion 622 of the nut 630. Also, the nut 630 is restrained so that the nut 630 does not move along the direction of the axis 800.

When the force applied by the drive shaft 410 along the direction of the axis 800 is transmitted from the thread ridge on the sun shaft 610 to the thread ridge on each planetary shaft 620, the lateral surface of the thread ridge on each planetary shaft 620 receives the force in the substantially vertical direction. Accordingly, the force for rotating each planetary shaft 620 is hardly generated. When the power source for the motor 700 is turned on to rotate each planetary shaft 620 using the spur gear in the gear portion 626, the sun shaft 610 moves along the direction of the axis 800. However, for example, when the power source for the motor 700 is turned off, the sun shaft 610 does not move, because the position of each planetary shaft 620 is fixed due to the friction caused in the actuator 500. As a result, the drive shaft 410 remains at the same position.

As the sensor 1000, the sensor that outputs pulses, such as a rotary encoder, may be used. The number of pulses is counted. Each of the maximum-side position and the minimum-side position of the drive shaft 410 is learned as the reference value, immediately after an ignition key is turned on. The displacement amount, by which the drive shaft 410 is displaced from the maximum-side position or the minimum-side position, is obtained by adding the counted number of pulses to the reference value. Thus, the control unit 200 obtains the value VC of the duration corresponding to the displacement amount (hereinafter, this value will be referred to as "sensor-based value VC").

Figure 7:
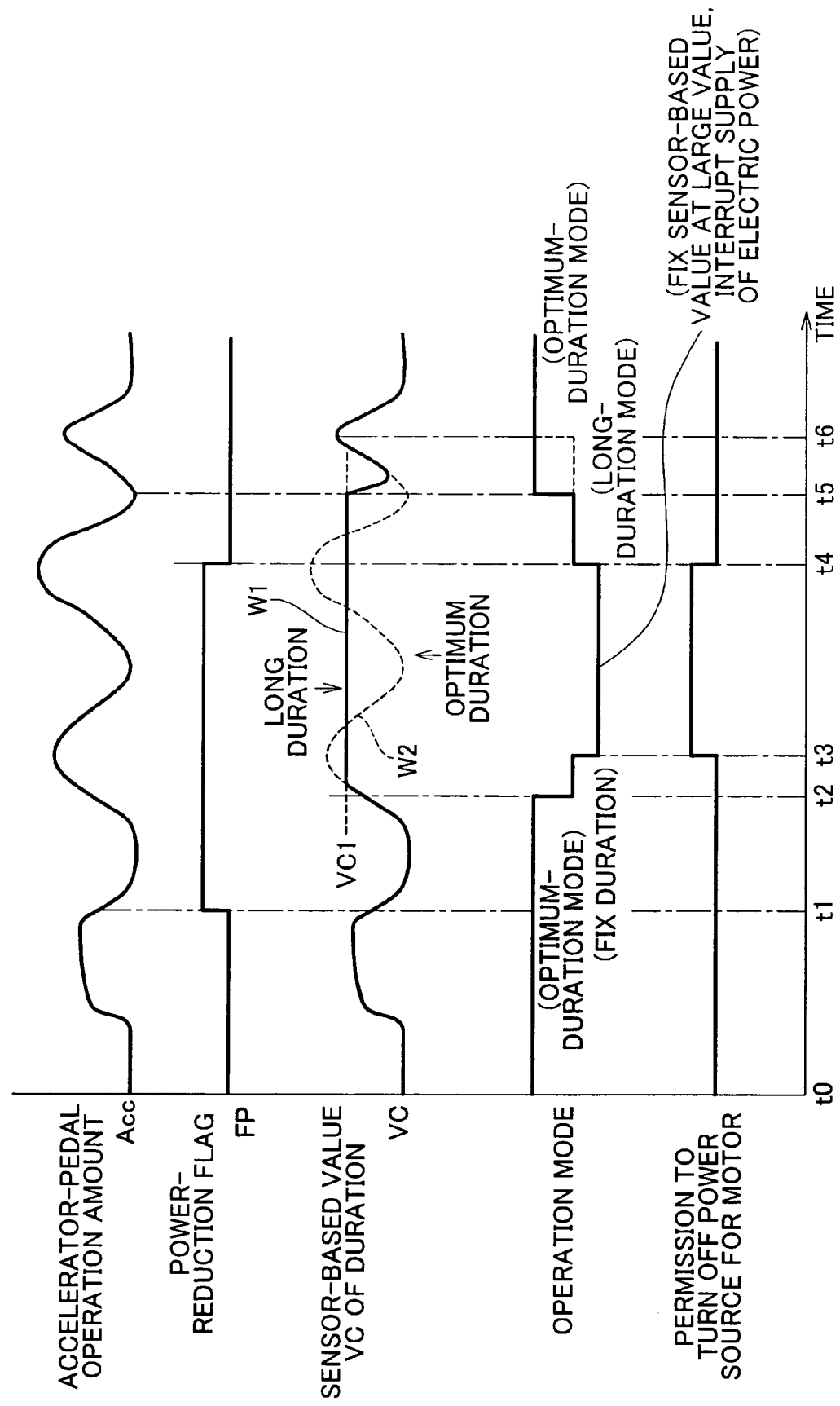
FIG. 7 is a waveform diagram explaining the operation for avoiding the overheating of the actuator.

FIG. 7 is a waveform diagram explaining the operation for avoiding the overheating of the actuator 500.

Figure 8:
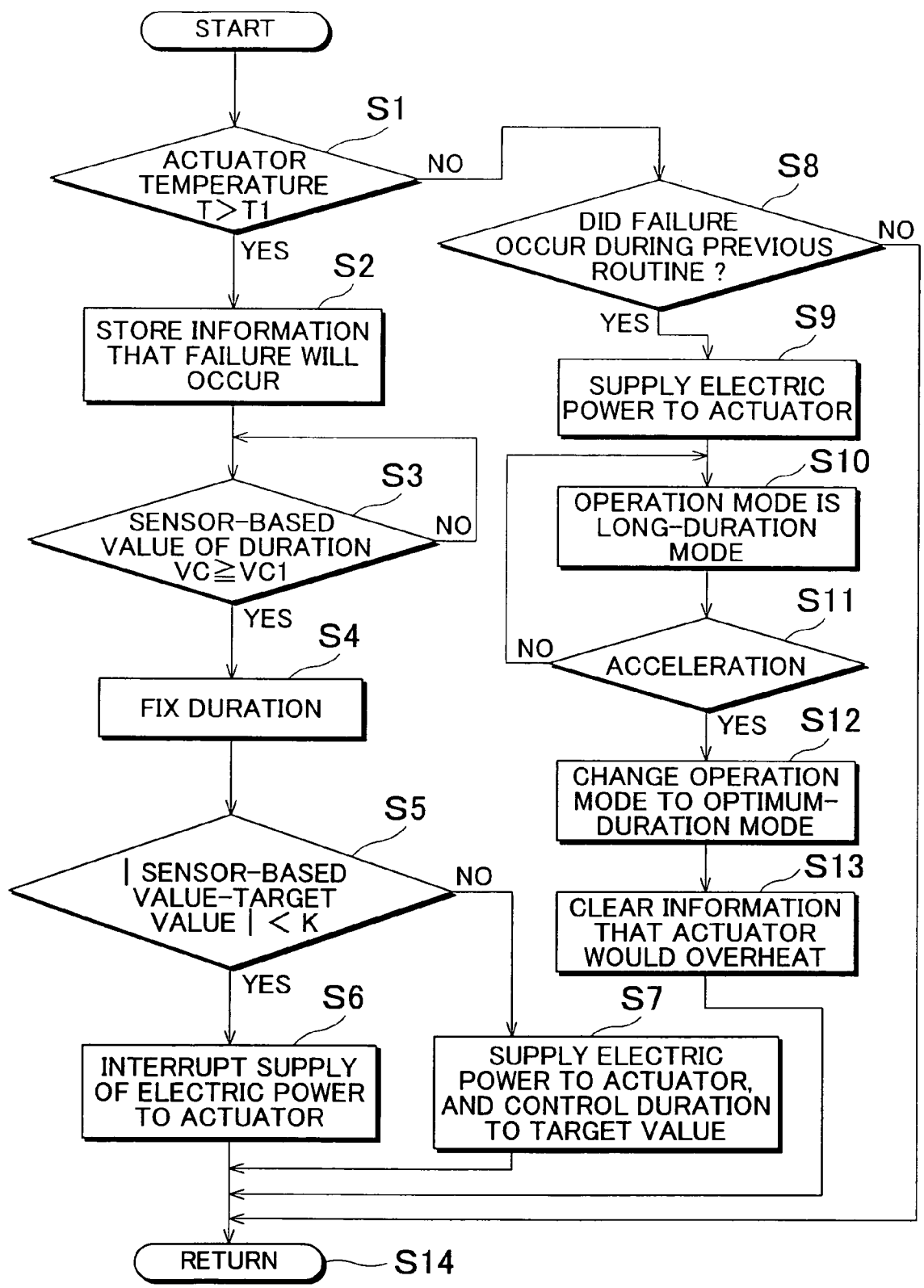
FIG. 8 is a flowchart explaining the control of the actuator, which is executed by a control unit.

FIG. 8 is a flowchart explaining the control for the actuator executed by the control unit 200. The routine shown by the flowchart is invoked from a predetermined main routine and executed, each time a predetermined time elapses, or each time a predetermined condition is satisfied.

Referring to FIGS. 7 and 8, the vehicle operates in "an optimum-duration mode" during the period from time point t0 to time point t1. In the optimum-duration mode, the lift and duration are changed based on the accelerator-pedal operation amount and the engine speed. During the period from time point t0 to time point t1, it is determined that the temperature T of the actuator 500 has not reached a threshold value T1 in step S1. Therefore, the routine proceeds to step S8. In step S8, it is determined that no failure has occurred in the actuator 500 due to overheating during the previous routine. Therefore, the routine proceeds to step S14, and the main routine is resumed.

In step S1, the temperature of the actuator 500 may be measured by a temperature sensor provided near the actuator 500, such as a thermistor. Alternatively, it may be determined whether the actuator 500 will overheat based on the period in which the actuator 500 continuously operates, or the amount of electric power consumed by the actuator 500.

If it is determined that the actuator 500 will overheat in step S1 at time point t1, the routine proceeds to step S2. An overheating flag, which indicates whether the actuator 500 will overheat, is turned on. In addition, the power-reduction flag FP, which indicates that the electric power supplied to the actuator 500 needs to be reduced, is turned on. However, the sensor-based value VC of the duration is smaller than the target fixed value VC1 of the duration in "a long-duration mode" in which the engine stably operates. Therefore, if the operation mode is suddenly changed from the optimum-duration mode to the long-duration mode, a driver may feel a torque shock.

The actuator 500 may overheat, for example, when the driver frequently operates the accelerator pedal to repeatedly accelerate and decelerate the vehicle on a winding mountain road. In such a situation, the variable valve mechanism repeatedly adjusts the duration. Therefore, even if the sensor-based value VC of the current duration is small, it is expected that the duration will increase soon.

Thus, the routine proceeds to step S3. In step S3, the control unit 200 determines whether the sensor-based value VC of the duration is equal to or larger than the target fixed value VC1 in the long-duration mode. Because the sensor-based value VC is smaller than the target valve VC1 during the period from time point t1 to time point t2, the monitoring process in step 3 continues.

When the sensor-based value VC is equal to or larger than the target fixed value VC1 at time point t2, the routine proceeds to step S4. In step S4, a fixed duration is temporarily maintained, without interrupting the supply of electric power to the actuator 500.

Then, in step S5, it is determined whether the absolute value of the difference between the sensor-based value VC and the target fixed value VC1 is smaller than a predetermined value K.

In the example in FIG. 7, the sensor-based value VC is fixed at the large value as indicated by the waveform W1 at time point t3. Therefore, the routine proceeds to step S6. In step S6, permission is given to turn off the power source for the motor 700. Thus, the supply of electric power to the actuator 500 is interrupted, while the sensor-based value VC is fixed at the large value.

In the period from time point t3 to time point t4, the engine is controlled in the long-duration mode. In this long-duration mode, the amount of intake air is adjusted by the throttle valve, while the supply of electric power to the actuator 500 is interrupted, and the duration is fixed as indicated by the waveform W1.

When the supply of electric power to the actuator 500 is interrupted, the drive shaft 410 remains at the same position due to the friction caused in the actuator 500, as described with reference to FIGS. 5 and 6. At this time, electric power continues to be supplied to the sensor 1000, and the sensor-based value VC, which indicates the position of the drive shaft 410, continues to be calculated.

If the sensor-based value VC deviates from the target fixed value VC1, that is, the absolute value of the difference between the sensor-based value VC and the target fixed value VC1 is equal to or larger than the predetermined value K due to some reason while the supply of electric power to the actuator 500 is interrupted, the routine proceeds from step S5 to step S7. In step S7, the supply of electric power to the actuator 500 is restarted, and the control unit 200 controls the actuator 500 so that the duration is equal to the target fixed value.

When step 6 or step 7 is finished, the routine proceeds to step S14, and the main routine is resumed.

When the temperature T of the actuator 500 decreases at time point t4, it is determined that the temperature T of the actuator 500 is equal to or lower than the threshold value T1 in step S1. Thus, the routine proceeds to step S8. Because the control unit 200 stores the information that a failure would occur in the actuator 500 in step S2 during the previous routine, the routine proceeds from step S8 to step S9.

In step S9, electric power is supplied to the actuator 500. The routine proceeds to step S10. In step S10, the engine is controlled in the long-duration mode such that the duration is fixed using the actuator 500. Thus, in the period from time point t4 to time point t5 in FIG. 7, the engine is controlled in this long-duration mode. If the operation mode is changed to the optimum-duration mode at time point t4, the driver may feel a torque shock due to a sudden change in the amount of intake air. Therefore, the operation mode is not changed to the optimum-duration mode at time point t4.

In the period from time point t4 to time point t5, it is determined whether the driver requests acceleration in step S11. If the driver does not request acceleration, steps S10 and S11 are repeatedly performed. If the driver requests acceleration, for example, by depressing the accelerator pedal at time point t5, the routine proceeds from step S11 to step S12.

In step S12, the operation mode is changed to the optimum-duration mode in which the duration is changed. Because the operation mode is changed when the driver requests acceleration, for example, by depressing the accelerator pedal, the optimum-duration mode is resumed without causing discomfort for the driver. In step S13, the information that a failure would occur in the actuator 500 due to overheating, which was stored in step S2, is cleared. After step S13 is finished, the routine proceeds to step S14, and the main routine is resumed.

Figure 9:
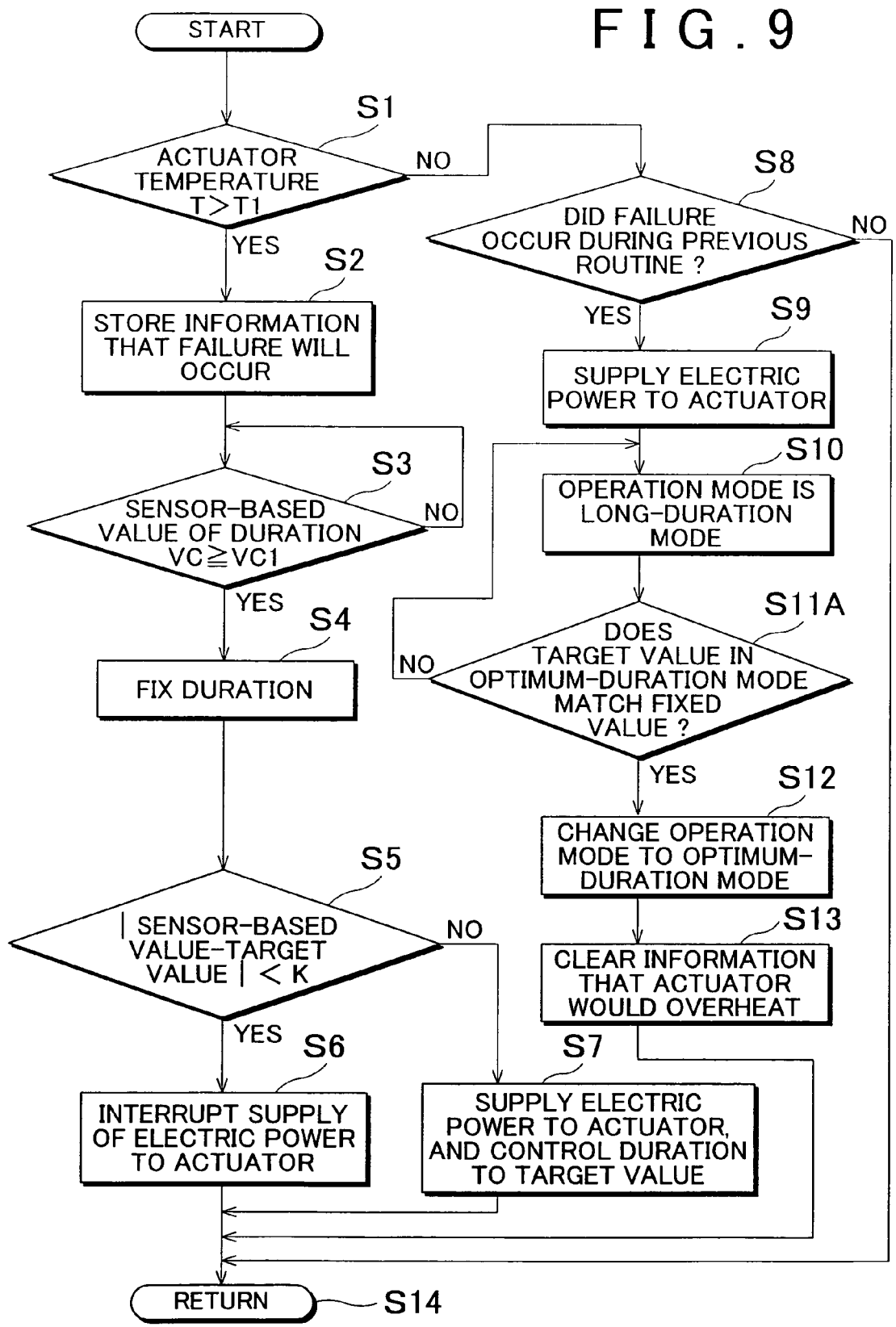
FIG. 9 is a flowchart showing a modified example of the control shown by the flowchart in FIG. 8.

FIG. 9 is a flowchart showing the modified example of the control shown by the flowchart in FIG. 8. In the flowchart in FIG. 8, it is determined whether the operation mode should be changed from the long-duration mode to the optimum-duration mode, based on whether the driver requests acceleration, for example, by operating the accelerator pedal in step S11. The flowchart in FIG. 9 includes step S11A instead of step S11. The other steps in the flowchart in FIG. 9 are the same as those in the flowchart in FIG. 8 that has been described above. Therefore, description of the other steps in the flowchart in FIG. 9 will be omitted.

In this modified example, while the engine is controlled in the long-duration mode such that the duration is fixed during the period from time point t2 to time point t4 in FIG. 7, the target value of the duration in the optimum-duration mode is calculated as indicated by the waveform W2.

In step S11A, it is determined whether the calculated target value of the duration in the optimum-duration mode matches the fixed value of the duration in the long-duration mode, or whether the difference between the calculated target value in the optimum-duration mode and the fixed value in the long-duration mode is equal to or smaller than a certain threshold value.

When the routine is executed based on the flowchart in FIG. 9, the engine is controlled in the long-duration mode in the period from time point t5 to time point t6, as indicated by dashed lines in the section for the sensor-based value VC and the section for the operation mode in FIG. 7. Then, at time point t6, the routine proceeds from step S11A to step S12, and the operation mode changes from the long-duration mode to the optimum-duration mode. In this modified example, when the operation mode is changed from the long-duration mode to the optimum-duration mode, the duration is not sharply changed. Therefore, the optimum-duration mode is resumed without causing discomfort for the driver.

The summary of the embodiment will be described with reference to FIG. 1 and FIG. 5. The VVTL mechanism 126 includes the actuator 500 that adjusts the lift of the intake valve 118 by moving the drive shaft 410 in the variable valve control, and the sensor used to determine whether the actuator 500 will overheat, such as a temperature sensor, an electric current sensor, or a voltage sensor. When the control unit 200 determines that the actuator 500 will overheat, the control unit 200 ends the variable valve control and stops the drive shaft 410 if the lift adjusted by the actuator 500 is equal to or larger than the first predetermined value VC1 shown in FIG. 7.

The actuator 500 may be an electric actuator. When the supply of electric power to the actuator 500 is interrupted, the actuator 500 may maintain the drive shaft 410 in a fixed position. The control unit 200 may interrupt the supply of electric power to the actuator 500.

The VVTL mechanism 126 may further include the sensor 1000 that detects the changes in the position of the drive shaft 410. The sensor 1000 may output signals indicating the position of the drive element. When the position of the drive shaft 410 deviates from the fixed position by at least a second predetermined value during the supply of electric power to the actuator 500 is interrupted, the control unit 200 may restart the supply of electric power to the actuator 500.

The control unit 200 may restart the supply of electric power to the actuator 500 when the VVTL mechanism 126 satisfies a condition for restarting operation of the actuator 500. The operation of the actuator 500 may restart when the temperature of the actuator 500 has decreased to a temperature that is equal to or below a threshold temperature at which the operation of the actuator 500 is stopped.

The control unit 200 may execute a control to fix the position of the drive shaft 410, immediately after the supply of electric power to the actuator 500 restarts.

The control unit 200 may execute the control to fix the position of the drive shaft 410 after the supply of electric power to the actuator 500 restarts. The control unit 200 may execute the variable valve control to change the position of the drive element using the actuator 500 when a request relating to the operation of an internal combustion engine satisfies a condition for resuming the variable valve control.

The condition for resuming the variable valve control may be satisfied, when, for example, a driver requests acceleration. In addition, the condition for resuming the variable valve control may be satisfied also when, for example, a position of the drive shaft 410, which is estimated on the assumption that the variable valve control is executed, matches the fixed position of the drive shaft 410, or when the difference between the estimated position and the fixed position is equal to or smaller than a predetermined amount.

The VVTL mechanism 126 may increase the lift, and the duration that represents the period in which the intake valve 118 is held open in terms of crank angle, by moving the drive shaft 410.

As described above, in this embodiment, the operation mode is not changed to the long-duration mode immediately after it is determined that the actuator will overheat. Instead, the engine continues to be controlled in the optimum-duration mode for a while. When the duration reaches the large value, the duration is fixed. This prevents a torque shock when an overheating-avoidance control is started.

Also, by interrupting the supply of electric power to the actuator, the amount of electric power consumed by the actuator is reduced to zero. This quickly decreases the temperature of the actuator.

Further, the engine control is changed from the overheating-avoidance control to a normal control, while suppressing a torque shock that may cause discomfort for the driver. Also, the operation mode is changed from the long-duration mode to the optimum-duration mode when it is determined that the duration will be long even if the optimum-duration mode is selected. This reduces the influence for causing a torque shock. That is, the operation mode is changed to the optimum-duration mode, while suppressing a torque shock.

Thus, the embodiment of the invention that has been disclosed in the specification is to be considered in all respects as illustrative and not restrictive. The technical scope of the invention is defined by claims, and all changes that come within the meaning and range of equivalency of the claims are therefore intended to be embraced therein.

What is claimed is:

1. A control device for a variable valve mechanism comprising:
    a drive element, provided in the variable valve mechanism, that determines a lift of at least one of an intake valve and an exhaust valve in an internal combustion engine;
    an electric actuator that adjusts a duration that represents a period in which the at least one of the intake valve and the exhaust valve is held open in terms of crank angle by moving the drive element in a variable valve control, and that is configured to maintain the drive element at a position after a supply of electric power to the actuator is interrupted, the position corresponding to a position of the drive element immediately before the supply of electric power to the actuator is interrupted;
    a first sensor that detects the duration;
    a second sensor used to determine whether the actuator will overheat; and
    a control unit that, when the control unit determines that the actuator will overheat based on an output from the second sensor, controls the supply of electric power to the actuator to maintain operation of the drive element under conditions corresponding to conditions prior to the determination that the actuator will overheat until the duration detected by the first sensor becomes equal to or larger than a target value, controls the supply of electric power to the actuator to maintain the duration at the target value when the duration is equal to or larger than the target value, and interrupts the supply of electric power to the actuator to maintain the position of the drive element after the control unit determines that the duration is maintained at the target value.

2. The control device for the variable valve mechanism according to claim 1,
    wherein the first sensor outputs signals indicating the position of the drive element, and the control unit restarts the supply of electric power to the actuator when the position of the drive element deviates from the fixed position by at least a second predetermined value when the supply of electric power to the actuator is interrupted.

3. The control device for the variable valve mechanism according to claim 1, wherein
    the control unit restarts the supply of electric power to the actuator when the variable valve mechanism satisfies a condition for restarting operation of the actuator; and
    operation of the actuator restarts when the temperature of the actuator has decreased to a temperature that is equal to or below a threshold temperature at which the operation of the actuator is stopped.

4. The control device for the variable valve mechanism according to claim 1, wherein
    the control unit executes a control to fix the position of the drive element, immediately after the supply of electric power to the actuator restarts.

5. The control device for the variable valve mechanism according to claim 4, wherein
    the control unit executes the variable valve control to change the position of the drive element using the actuator when a request relating to an operation of an internal combustion engine satisfies a condition for resuming the variable valve control.

6. The control device for the variable valve mechanism according to claim 5, wherein
    the condition for resuming the variable valve control is satisfied when a driver requests acceleration.

7. The control device for the variable valve mechanism according to claim 5, wherein
    the condition for resuming the variable valve control is satisfied when a difference between a position of the drive element, which is estimated on an assumption that the variable valve control is executed, and the fixed position of the drive element is equal to or smaller than a predetermined amount.

8. The control device for the variable valve mechanism according to claim 1, wherein
    the variable valve mechanism increases the duration and a maximum lift of the at least one of the intake valve and the exhaust valve, by moving the drive element.

9. The control device for the variable valve mechanism according to claim 1, wherein
    the control unit controls an amount of intake air by adjusting a throttle valve opening amount in accordance with the amount by which an accelerator pedal is depressed and continues an operation of the internal combustion engine.

10. The control device for the variable valve mechanism according to claim 9, wherein
    the control unit controls an amount of intake air by adjusting a throttle valve opening amount in accordance with the amount by which the accelerator pedal is depressed and continues an operation of the internal combustion engine.

11. A method of controlling a variable valve mechanism comprising:
    detecting a duration which represents a period in which at least one of an intake valve and an exhaust valve is held open in terms of crank angle, and which varies by moving a drive element in a variable valve control;
    determining whether an actuator will overheat;
    controlling, when it is determined that the actuator will overheat, a supply of electric power to the actuator to maintain operation of the drive element under conditions corresponding to conditions prior to the determination that the actuator will overheat until the duration becomes equal to or larger than a target value and controlling the supply of electric power to the actuator to maintain the duration at the target value when the duration is equal to or larger than the target value; and
    interrupting the supply of electric power to the actuator to maintain the drive element at a fixed position after it is determined that the duration is maintained at the target value.

12. A control device for a variable valve mechanism comprising:
    a drive element, provided in the variable valve mechanism that determines a lift of at least one of an intake valve and an exhaust valve in an internal combustion engine;

an electric actuator that adjusts a maximum lift of the at least one of the intake valve and the exhaust valve by moving the drive element in a variable valve control, and that is configured to maintain the drive element at a position after a supply of electric power to the actuator is interrupted, the position corresponding to a position of the drive element immediately before the supply of electric power to the actuator is interrupted;

a first sensor that detects the position of the drive element;

a second sensor used to determine whether the actuator will overheat; and a control unit that, when the control unit determines based on an output of the second sensor that the actuator will overheat, controls the supply of electric power to the actuator to maintain operation of the drive element under conditions corresponding to conditions prior to the determination that the actuator will overheat until the position detected by the first sensor becomes equal to or larger than a target fixed position, controls the supply of electric power to the actuator to maintain the drive element at the target fixed position when the position of the drive element reaches the target fixed position, and interrupts the supply of electric power to the actuator to maintain the drive element at the target fixed position after the control unit determines that the drive element is maintained at the target fixed position.

13. The control device for the variable valve mechanism according to claim 12, wherein the control unit restarts the supply of electric power to the actuator when the position of the drive element deviates from the fixed position by at least a second predetermined value when the supply of electric power to the actuator is interrupted.

14. The control device for the variable valve mechanism according to claim 12, wherein the control unit restarts the supply of electric power to the actuator when the variable valve mechanism satisfies a condition for restarting operation of the actuator; and operation of the actuator restarts when the temperature of the actuator has decreased to a temperature that is equal to or below a threshold temperature at which the operation of the actuator is stopped.

15. The control device for the variable valve mechanism according to claim 12, wherein the control unit executes the control to fix the position of the drive element after the supply of electric power to the actuator restarts, and the control unit executes the variable valve control to change the position of the drive element using the actuator when a request relating to an operation of an internal combustion engine satisfies a condition for resuming the variable valve control.

16. The control device for the variable valve mechanism according to claim 15, wherein the condition for resuming the variable valve control is satisfied when a driver requests acceleration.

17. The control device for the variable valve mechanism according to claim 15, wherein the condition for resuming the variable valve control is satisfied when a difference between a position of the drive element and the fixed position of the drive element is equal to or smaller than a predetermined amount.

18. A control method for a variable valve mechanism comprising:

detecting a position of a drive element;

determining whether an actuator will overheat; and controlling, when it is determined based on an output of a second sensor that the actuator will overheat, a supply of electric power to the actuator to maintain operation of the drive element under conditions corresponding to conditions prior to the determination that the actuator will overheat until the position becomes equal to or larger than a target fixed position and controlling the supply of electric power to the actuator to maintain the drive element at the target fixed position when the position of the drive element moves to the target fixed position; and interrupting the supply of electric power to the actuator to maintain the drive element at the target fixed position after it is determined that the drive element is maintained at the target fixed position.

* * * * *